United States Patent
Krawiec et al.

[11] Patent Number: 5,999,593
[45] Date of Patent: Dec. 7, 1999

[54] SYSTEM AND METHOD FOR AUTOMATIC PBX DETECTION

[75] Inventors: Guillermo Damian Krawiec, Cochabamba, Bolivia; Eugene E. Kielty, Jr., Depew, N.Y.

[73] Assignee: Voice Technologies Group, Inc., Buffalo, N.Y.

[21] Appl. No.: 09/009,561

[22] Filed: Jan. 20, 1998

[51] Int. Cl.[6] .................................................. H04M 1/24
[52] U.S. Cl. ............................ 379/15; 379/1; 379/156
[58] Field of Search ............................ 379/1, 9, 10, 15, 379/27, 29, 30, 32, 34, 140, 133, 134, 156, 157, 165, 164

[56] References Cited

U.S. PATENT DOCUMENTS

| | | | |
|---|---|---|---|
| 4,850,011 | 7/1989 | Delmege et al. | 379/157 |
| 5,195,085 | 3/1993 | Bertsch et al. | 379/1 |
| 5,579,369 | 11/1996 | Feiner et al. | 379/10 |
| 5,742,671 | 4/1998 | Parkerson et al. | 379/156 |

*Primary Examiner*—Paul Loomis
*Attorney, Agent, or Firm*—Hodgson, Russ, Andrews, Woods & Goodyear LLP

[57] ABSTRACT

In a telephone network including a PBX connected between a central/public office switch and one or more terminals where a computer telephony interface is connected to the PBX, a system operatively associated with the computer telephony interface and responsive to an operational characteristic of the PBX for sensing, detecting and identifying the type of PBX connected to the computer telephony interface. The operational characteristic utilized is the DC power levels for various PBXs. The system automatically senses, detects and identifies the type of PBX which is connected to the computer telephony interface. Automation of this procedure simplifies the user interface by providing the computer telephony interface with information which it can then use to configure itself and function in the required mode without having any type of user input.

25 Claims, 6 Drawing Sheets

SYSTEM AND METHOD FOR AUTOMATIC PBX DETECTION

BACKGROUND OF THE INVENTION

This invention relates to the art of telephone systems, and more particularly to a new and improved method and system for sensing, detecting and identifying a telephone PBX.

In a basic PBX (private branch exchange) configuration, the PBX is connected between the central office switch and the individual telephone stations. In a computer/telephony integration a computer is connected to one of the station lines to emulate the telephone terminals with the end result of controlling most of the features offered by the PBX through the computer interface. For the computer/telephony interface to configure itself to meet the characteristics of the PBX, it must be able to determine what type of PBX it is connected to. Heretofore, this has been accomplished by manual configurations or different hardware modules for each type of PBX. These approaches undesirably require human intervention or inventory of individual modules.

It would, therefore, be highly desirable to provide a system and method for automatically sensing, detecting and identifying a telephone PBX which requires no manual intervention or inventory of individual hardware modules. As a result, in computer/telephony integration, modifications needed between PBX integration platforms advantageously would involve software and firmware rather than hardware. In addition, this allows a simplified user interface to be provided which minimizes the amount of prior knowledge required from the consumer and reduces the time from setup to full operation by having the system configure itself to the user's needs.

The present invention provides, in a telephone system including a PBX connected between a central/public office switch and one or more terminals where a computer telephony interface is connected to the PBX, means operatively associated with the computer telephony interface and responsive to an operational characteristic of the PBX for sensing, detecting and identifying the type of PBX connected to the computer telephony interface. The operational characteristic utilized is the DC power levels for various PBXs. The present invention automatically senses, detects and identifies the type of PBX which is connected to the computer telephony interface. Automation of this procedure simplifies the user interface by providing the computer telephony interface with information which it can then use to configure itself and function in the required mode without having any type of user input.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
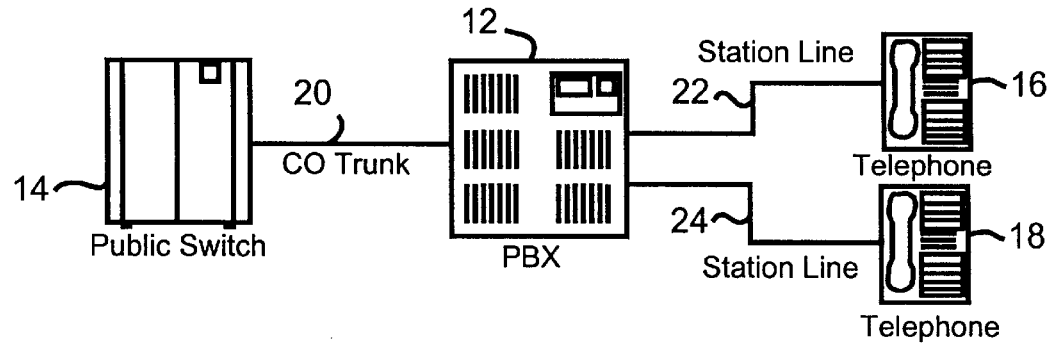
FIG. 1 is a diagrammatic view illustrating a basic PBX configuration.

In a basic digital PBX configuration as shown in FIG. 1, a PBX 12 stands between a Central/Public Office (CO) switch 14 and the individual stations, two of which are designated 16 and 18 in FIG. 1. The CO trunk 20 connects the CO 14 to the PBX 12 and can involve one of several types of communication protocols and/or methods. Each station line 22 and 24 is the communication line between the PBX 12 and the individual station telephones 16 and 18, respectively. Each station line also can use one of various communication methods.

Since the PBX 12 stands between the CO 14 and the telephones 16, 18, it can provide electrical and signaling isolation between the two of them. Because of this, the communication standards between the PBX 12 and the CO 14 and those between the telephones 16, 18 and the PBX 12 do not necessarily have to be identical. It is the PBX 12 that performs the "translation" between them. The communication protocols between the CO 14 and the PBX 12 are and always have been open standards. On the other hand, the station 16, 18 to PBX 12 communication protocols historically have been proprietary protocols. One of the basic methods of communication used between the PBX 12 and the station telephones 16, 18 is digital signaling communication, and it is on this method which the present illustration is focused.

Figure 2:
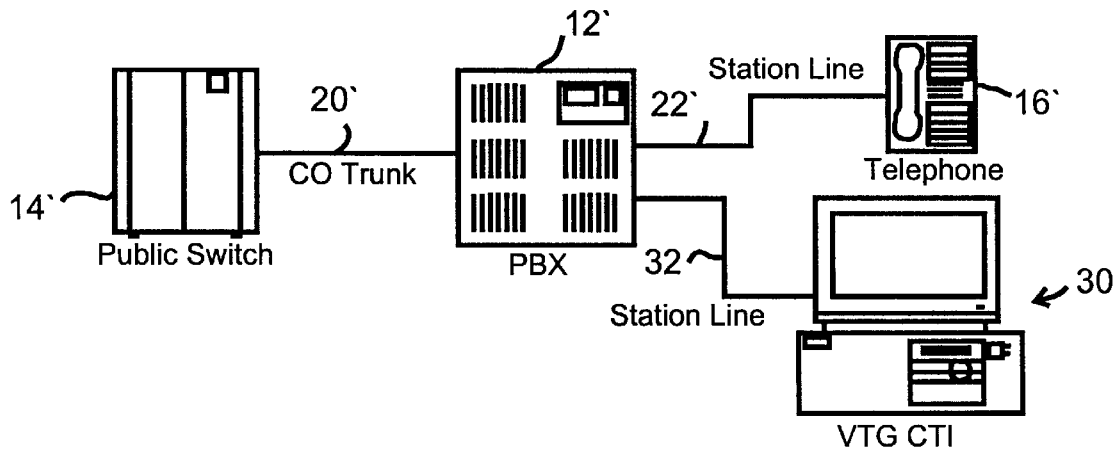
FIG. 2 is a diagrammatic view illustrating a basic PBX and computer telephony interface configuration.

In a computer/telephony interface a computer is connected to one of the station lines to emulate the telephone terminals with the end result of controlling most of the features offered by the PBX through the computer interface. As shown in FIG. 2, computer 30 is connected to station line 32. The computer/telephony interface "opens up" the proprietary signaling protocols of the PBX. By emulating the telephone terminals it is possible to fool the PBX 12' into thinking that it is connected to one of them. Once this is done, it is possible to control most of the features offered by the PBX 12' through the computer interface 30. The computer/telephony interface shown in FIG. 2 is of the type commercially available from Voice Technologies Group of Buffalo, N.Y.

Figure 3:
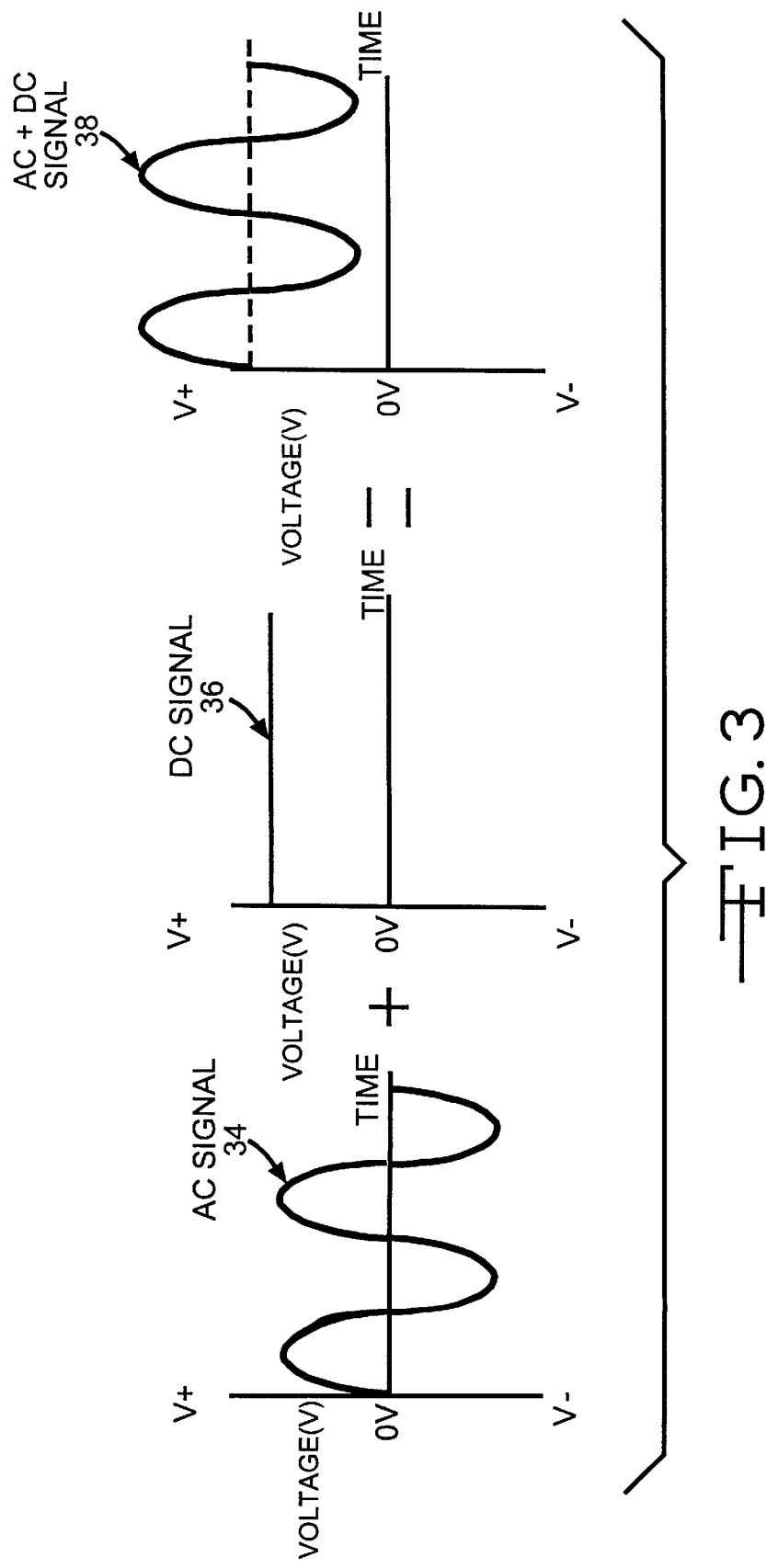
FIG. 3 is a graph presenting waveforms illustrating digital signal and power transmission between PBX and telephone station.

There are two characteristics that have to be met by the transmission method utilized between the PBX and the telephone station. First, it has to be able to transfer electrical power from the PBX into the telephone for basic operation, and second it has to be able to transmit and receive signals to and from the telephone. Usually, the power has been transferred in the form of a DC voltage. The transmit and receive signals are digital signals that have been transmitted in different forms (depending on the PBX), but usually it has been in the form of an encoded analog wave (AC voltage) which easily can be converted back to its original digital form. Since both the power and the signaling travel in the same lines, this is done by simply adding the AC signal designated 34 in FIG. 3 to the DC signal 36 to provide the AC+DC signal designated 38 in FIG. 3. In the same way, as these two distinct characteristics of the transmission line have been added, it is possible then to extract one from the other and once again end up with a power source and a signal. These two operations, the addition and the extraction, are done at both ends of the transmission line, at the PBX and at the terminal.

In order for sensing, detecting and identifying which PBX has been connected to a computer/telephony interface in accordance with the present invention, knowledge of the characteristics of the power transmission and digital communication protocols is required. Several differences between the PBXs have been found. While the main difference between various manufacturers and models is in the signalling protocol and encoding scheme, it also was found that the DC power levels used between the various PBXs is different. Table 1 presents information about those DC power levels determined in accordance with the present invention:

TABLE 1

| PBX/KSU Model | DC Voltage (Vdc) | Lines for RJ45 | Lines for RJ11 |
|---|---|---|---|
| ROLM | 48 | 4, 5 | 2, 3 |
| NORTEL M-1 | 28 | 4, 5 | 2, 3 |
| NORTEL Norstar | 13–23 | 4, 5 | 2, 3 |
| Lucent (AT&T) | 48 | 1, 3 | not valid |

Thus, for a ROLM PBX or Key System Unit, 48 volts DC is present on the lines leading from the PBX/KSU to the telephone station or to the computer telephony interface. When an RJ45 connector is used, this voltage is present on lines nos. 4 and 5 leading from the PBX/KSU, and when an RJ11 connector is used the voltage is present on lines nos. 2 and 3. With the NORTEL Norstar PBX/KSU the voltage varies over a relatively wider range of 13–23 volts dc depending upon the distance between the PBX/KSU and the telephone terminal.

Figure 4:
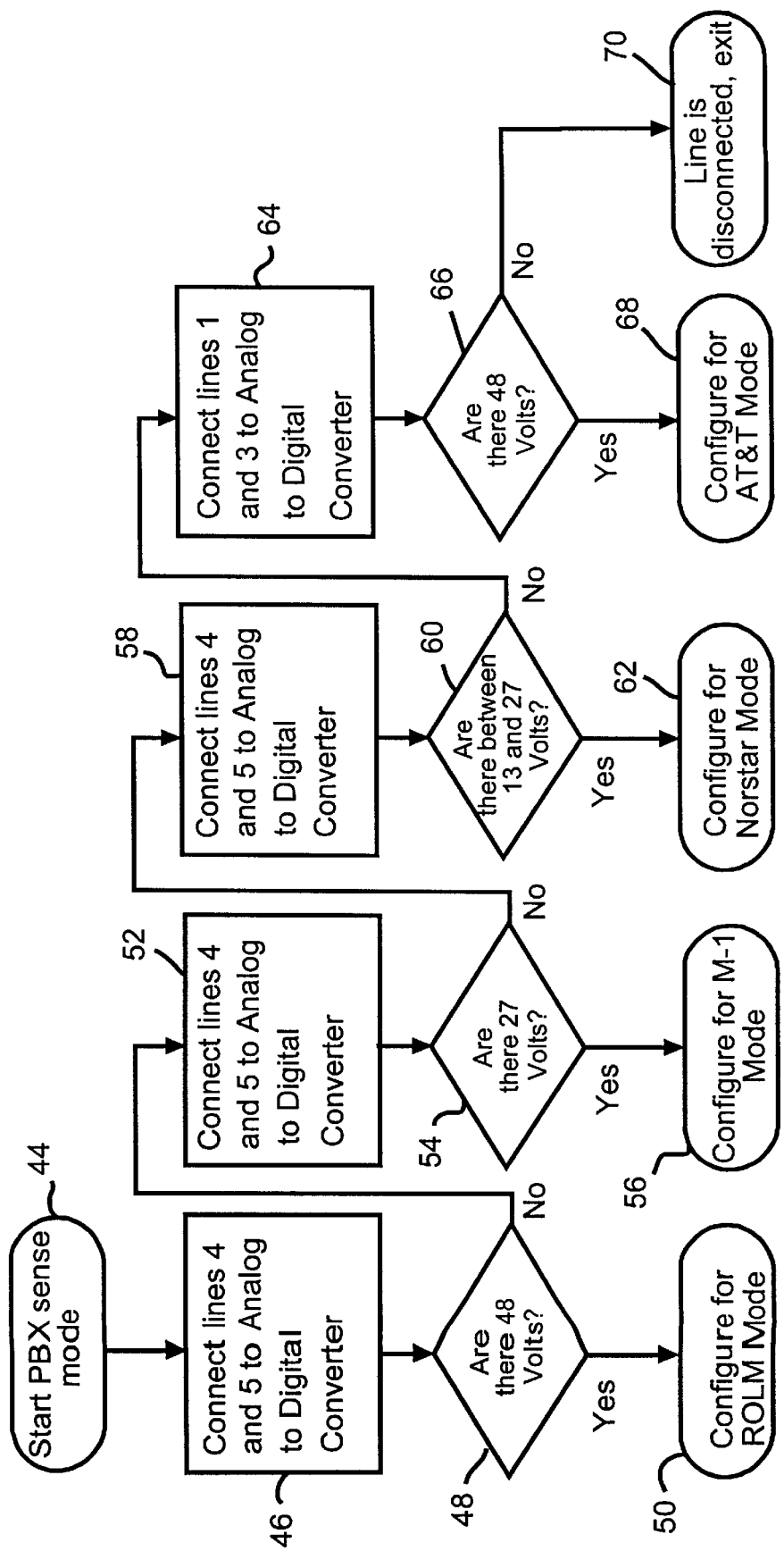
FIG. 4 is a block diagram flow chart illustrating the method of the present invention.

Using the information set forth in Table 1, a PBX Sense, Detect and Identify Algorithm is developed according to the present invention and is illustrated in FIG. 4. In order to carry out the method shown in FIG. 4, the computer telephony interface, such as that designated 30 in FIG. 2, is placed in a PBX detection mode. This is represented by the function block 44 in FIG. 4. In this mode the system has the ability of extracting the power signal from the transmission line, measuring its value and digitizing it. This digitized data is then sent to the microprocessor in the computer telephony interface as will be described in further detail presently, which in turn compares this data to its database. If the microprocessor does not find a match, it proceeds to change the configuration of the detection circuitry in order to test different lines for different voltages. Changing the configuration of the detection circuitry means testing different PBX lines, i.e. lines 1 and 3 instead of lines 4 and 5. The microprocessor will do this following strict rules until it finds a match. Once this happens, it goes out of the PBX detection mode and moves into a computer telephony interface mode. In this mode the microprocessor will then try to synchronize with the PBX and begin to transmit and receive data in a normal mode of operation.

The foregoing is illustrated in further detail in FIG. 4. The system of the present invention connects lines 4 and 5 of the PBX to an analog to digital converter as indicated in function block 46. The analog to digital converter and its relation to the remainder of the system will be described in detail presently. The system then tests the voltage on lines 4 and 5 of the PBX to determine if the magnitude is about 48 volts as indicated in decision block 48. If so, in accordance with the information set forth in Table 1 the system identifies the PBX as a ROLM type and proceeds to configure the computer telephony interface for a ROLM PBX. This is indicated in function block 50. If not, the system again connects lines 4 and 5 of the PBX to the A/D converter as indicated in function block 52 and then tests the voltage on the lines to determine if the magnitude is about 28 volts as indicated in decision block 54. If so, in accordance with the information in Table 1 the system identifies the PBX as a NORTEL M-1 type and proceeds to configure the computer telephony interface for a NORTEL M-1 PBX as indicated in function block 56. If not, the system again connects lines 4 and 5 of the PBX to the A/D converter as indicated in function block 58 and then tests lines 4 and 5 to determine if the voltage magnitude thereon is between 13 and 28 volts as indicated in decision block 60. If so, in accordance with the information in Table 1 the system identifies the PBX as a NORTEL Norstar type and configures the computer telephony interface for a NORTEL Norstar PBX as indicated in function block 62. If not, as indicated in function block 64, the system changes the configuration of the detection circuitry by connecting the A/D converter to lines 1 and 3 of the PBX and then, as indicated in decision block 66, tests lines 1 and 3 of the PBX to determine if the DC voltage magnitude thereon is 48 volts. If so, in accordance with the information in Table 1 the system identifies the PBX as a LUCENT (AT&T) PBX and configures the computer telephony interface for that kind of PBX as shown in function block 68. If not, in the algorithm illustrated in FIG. 4, the A/D converter is disconnected from the PBX lines and the system exits from the program of FIG. 4 as indicated by function block 70. Function blocks 52 and 58 are included in the flow diagram of FIG. 4 for purposes of illustration and explanation. Since the voltage magnitudes of 28 and 13–28 will appear only on the PBX lines nos. 4 and 5, function blocks 52 and 58 can be eliminated in an actual implementation of the algorithm of FIG. 4 and the no outputs of decision blocks 48 and 54 can be connected directly to the inputs of decision blocks 54 and 60, respectively.

Figure 5:
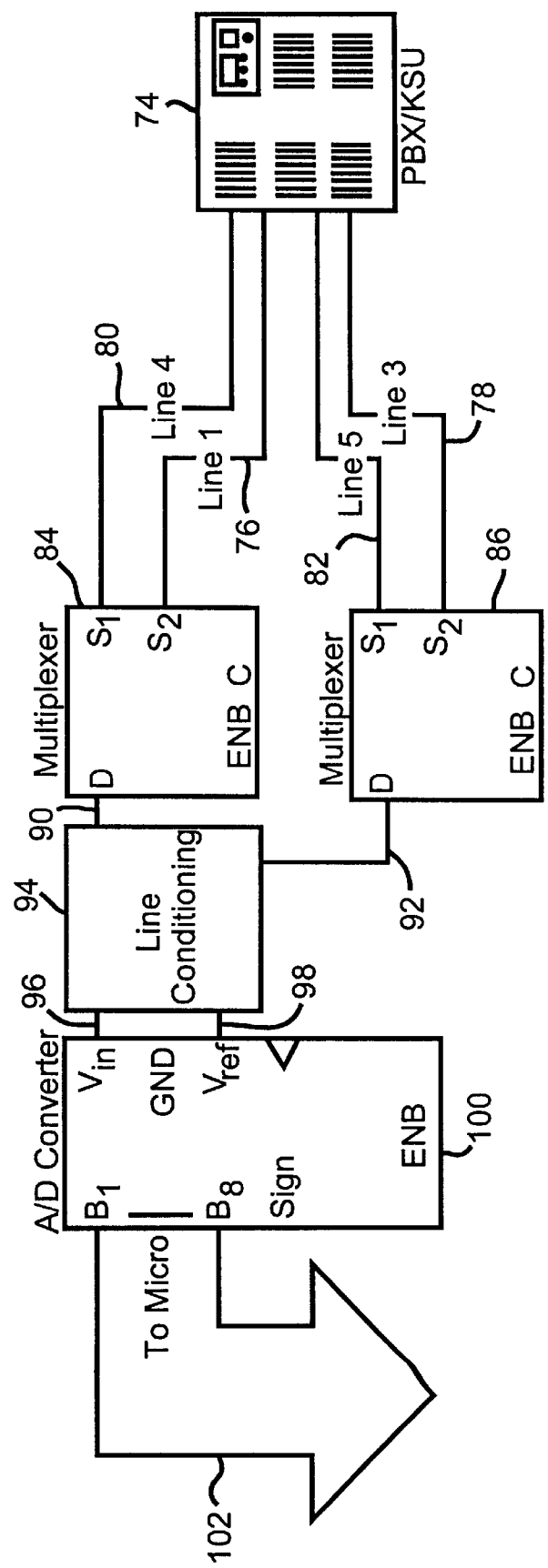
FIG. 5 is a block diagram illustrating the system of the present invention.

The system of the present invention is implemented by the arrangement illustrated by the general block diagram of FIG. 5. The basic circuit involves switching or multiplexing one of several pairs of wires leading from the PBX and routing them through a line conditioning circuit into an analog to digital converter. In particular, PBX 74 shown in FIG. 5 is like PBX 12 or 12' shown in FIGS. 1 and 2. Lines nos. 1 and 3 previously described are designated 76 and 78, respectively, in FIG. 5 and, likewise, lines 4 and 5 are designated 80 and 82, respectively. The lines are connected to inputs of a pair of switching means or multiplexers 84 and 86. The enable ENB and control C inputs to multiplexers 84 and 86 are received from the system microprocessor or microcontroller (not shown in FIG. 5). The outputs of multiplexers 84 and 86 are connected by lines 90 and 92 to a line conditioning circuit 94 which will be described in detail presently. The circuit 94 provides inputs on lines 96 and 98 to the system analog to digital converter designated 100, the outputs of which are applied as indicated at 102 to the system microcontroller.

In order for the circuit of FIG. 5 to be of practical use, it must meet the criteria of being able to measure the differential line voltage on different sets of lines, being of low cost, and being of relatively small size so as to occupy minimal space on the printed circuit board of the computer telephony interface. To be able to meet the cost requirement, a low priced analog to digital converter has to be used. By doing so, several additional requirements arise. The line voltages that need to be measured have to be differential. Low priced A/D converters only measure ground referenced voltages. Another requirement arises from the fact that the voltage ranges that need to be measured vary from 13±3 Vdc to 48±3 Vdc. A/D converters usually only are capable of reading voltages that range from 0 (gnd) through Vcc (usually +5 Vdc). A further requirement results from the fact that the line voltages originating at the PBXs do not all have the same polarity on the same lines. By way of example, in an illustrative circuit, A/D converter 100 can comprise a CMOS 8-bit A/D converter commercially available from Signetics Linear Products under the designation ADC0803/4-1.

To satisfy these requirements line conditioning circuit 94 must perform the following functions. It has to bring the line voltages down from a 10–50 Vdc range down to a 0 to 5 Vdc range. It must be able to convert the differential voltage into a ground referenced one. Since line polarities vary between PBXs, it must be able to support negative voltages on either input of the A/D converter.

Figure 6:
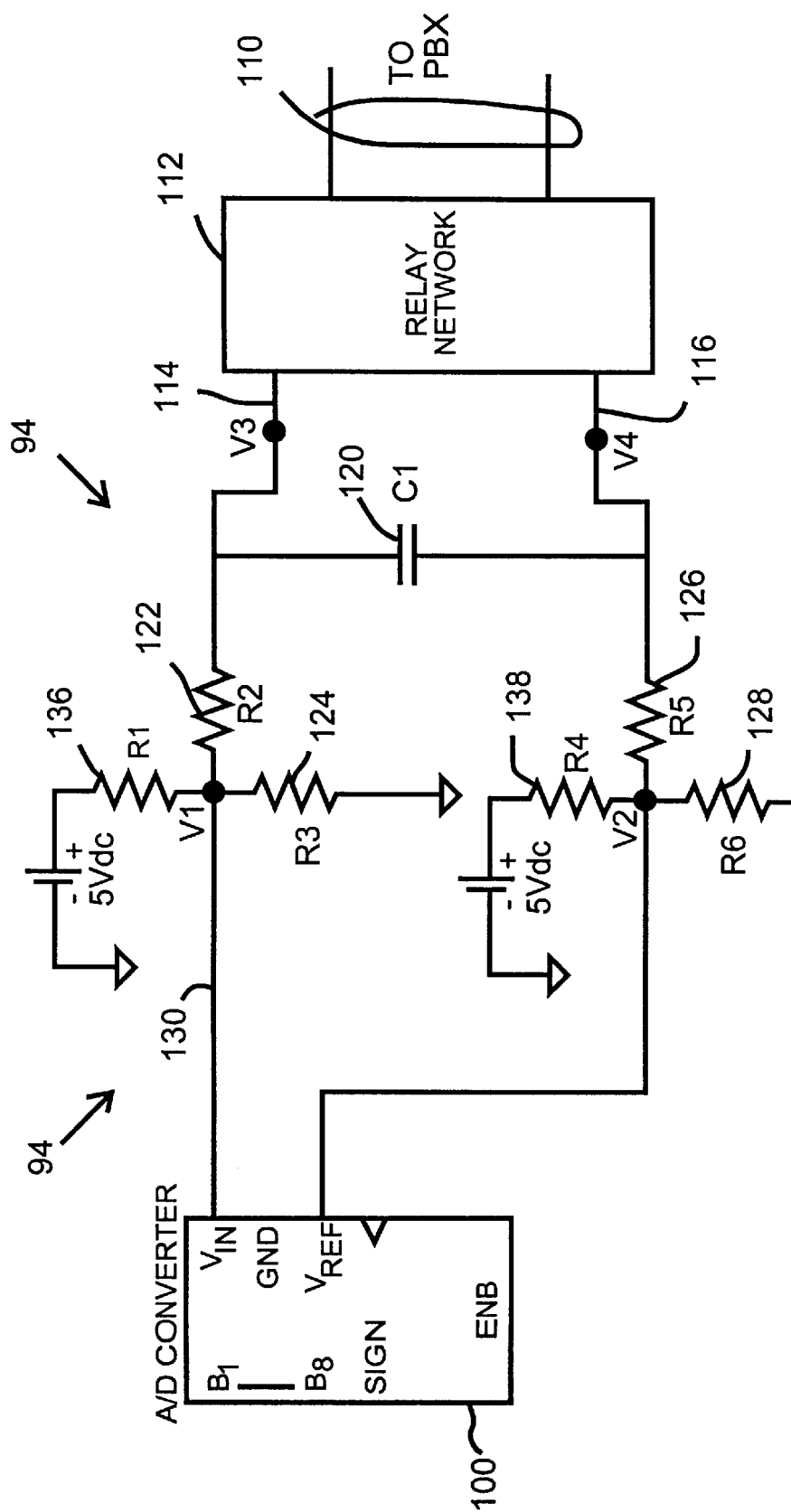
FIG. 6 is a schematic diagram of the line conditioning circuit in the system of FIG. 5.

FIG. 6 illustrates a preferred form of line conditioning circuit 94 which satisfies the foregoing requirements and performs the foregoing functions. The lines collectively designated 110 represent the 4 or 8 lines leading from the PBX 74, depending the type of connector employed. Switching is performed either by an analog multiplexer network as shown in FIG. 5 or by a relay network as indicated at 112 in FIG. 6, both under control of the system microcontroller or microprocessor (not shown in FIG. 6). The output of relay network 112 on lines 114 and 116 includes voltages at points $V_3$ and $V_4$ which, depending on the PBX, can be at one of several differential voltages between each other. These voltages can vary from −50 VAC to +50 VAC. Riding on top of this voltage is an AC voltage ranging from −10 VAC to +10 VAC. Capacitor 120 is provided across lines 114 and 116 to AC couple the two transmission lines. Next, since the required input to the A/D converter 100 has to be ground referenced and between 0V and +5V, the combinations of resistors 122, 124 and 126, 128 are connected between corresponding terminals of capacitor 120 and the circuit ground or reference. These resistors serve the circuit by providing a reference to ground, and by lowering the voltage present at points $V_1$ and $V_2$ by being placed in a voltage divider configuration. Since the polarity of the voltage on each of the lines 130 and 132 connecting $V_1$ and $V_2$ to A/D converter 100 depends on the PBXs, and the A/D converter 100 requires Vin to be at a greater voltage than Vref, one more pair of resistors has to be added. In particular, the difference between the A/D converter inputs Vin and Vref must be in the range 0–+5 volts, and each input Vin and Vref must be within the range 0–+5 volts. As previously described, the voltages at each of the points $V_3$ and $V_4$ in the circuit of FIG. 6 can vary from −50 volts to +50 volts. Therefore, the combination of resistors 122, 124 and 136 is provided to convert the voltage at point $V_3$ to a range from +2.5 volts to +5.0 volts. Similarly, the combination of resistors 126, 128 and 138 is provided to convert the voltage at point $V_4$ to a range from 0 to +2.5 volts. Therefore, the voltage at the Vin input of A/D convertor 100 is always more positive than the voltage at the Vref input.

The following examples illustrate the manner in which the magnitudes of the resistors in the circuit of FIG. 6 can be determined. Three methods will be illustrated and are identified herein as simultaneous equation, current loop equation and theoretical equation methods. Considering first the simultaneous equation method, assume that the two resistors 136 and 138 are provided in order to bias the voltage at points $V_1$ and $V_2$ so that $V_1$ is always at a higher voltage than $V_2$. This is done by biasing $V_1$ at 3.75 VDC and $V_2$ at 1.25 VDC, and then limiting the swing of a −50 to +50 VDC down to a −1.25 to +1.25VDC in reference to the indicated values of $V_1$ and $V_2$. As a result, the requirements on the voltage are as follows:

$V_{1BIAS}$=+3.75 Vdc $V_{2bias}$=+1.25 Vdc $V_1$=+5.00 Vdc when $V_3$=+50 Vdc $V_1$=+2.50 Vdc when $V_3$=−50 Vdc $V_2$=+2.50 Vdc when $V_4$=+50 Vdc $V_2$=+0.00 Vdc when $V_4$=−50 Vdc There are three equations to solve for each set of three resistors in the circuit of FIG. 6. The first set is resistors 136, 122 and 124 also designated R1, R2 and R3, respectively. The equations for this first set of resistors are as follows:

$$\text{Equation 1}: \quad V_1 = \frac{+5(R_2 \| R_3)}{(R_1 + R_2 \| R_3)}; V_1 = 3.75$$

$$\text{Equation 2}: \quad V_1 = \frac{+50(R_1 \| R_3)}{(R_1 \| R_3 + R_2)}; V_1 = 5.00$$

$$\text{Equation 3}: \quad V_1 = \frac{-50(R_1 \| R_3)}{(R_1 \| R_3 + R_2)}; V_1 = 2.50$$

The current loop equation method for the first set of resistors 136, 122 and 124, i.e. $R_1$, $R_2$ and $R_3$ is as follows. Consider the situation where the A/D converter 100 voltage Vin is positive. In the circuit of FIG. 6, the resistors 136, 122 and 124 are identified as R1, R2 and R3, respectively. I1 is the current flowing through resistor R1 toward the point V1 shown in FIG. 6, I2 is the current flowing through resistor R2 toward point V1 and I3 is the current flowing through resistor R3 away from point V1. This analysis includes three cases. In case 1, the voltages V1 and V3 shown in FIG. 6 are +5 volts and +50 volts, respectively, in case 2 V1 is +3.75 volts and V3 is 0 volts and in case 3 V1 is 2.5 volts and V3 is −50 volts.

The current loop equations in reference to the node at point V1 in the circuit of FIG. 6 are as follows:

Case 1 (Equation 1)

$$I_1 = \frac{5-5}{R1}; I_2 = \frac{50-5}{R2}; I_3 = \frac{5-0}{R3}; I3 = I1 + I2$$

$$\text{Therefore: } \frac{5}{R3} = \frac{0}{R1} + \frac{45}{R2}$$

Case 2 (Equation 2)

$$I_1 = \frac{5-3.75}{R1}; I_2 = \frac{0-3.75}{R2}; I_3 = \frac{3.75-0}{R3}; I3 = I1 + I2$$

$$\text{Therefore: } \frac{3.75}{R3} = \frac{1.25}{R1} + \frac{-3.75}{R2}$$

Case 3 (Equation 3)

$$I_1 = \frac{5-2.5}{R1}; I_2 = \frac{-50-2.5}{R2}; I_3 = \frac{2.5-0}{R3}; I3 = I1 + I2$$

$$\text{Therefore: } \frac{2.5}{R3} = \frac{2.5}{R1} + \frac{-52.5}{R2}$$

Assuming a value of 10,000 ohms for R1, the value of R2 and R3 can be calculated via the current loop equations as follows:

$R1 = 10000 \quad R2 = 1 \quad R3 = 1$

Given $$\frac{5-0}{R3} = \frac{5-5}{R1} + \frac{50-5}{R2}$$

$$\frac{3.75-0}{R3} = \frac{5-3.75}{R1} + \frac{3.75-0}{R2}$$

$$\frac{2.5-0}{R3} = \frac{5-2.5}{R1} + \frac{2.5-(-50)}{R2}$$

$$\text{find }(R2, R3) = \begin{matrix} 3 \cdot 10^5 & R2 \\ 3.333 \cdot 10^4 & R3 \end{matrix}$$

The foregoing equations were solved using software commercially available from MathSoft, Inc. under the designation Mathcad Plus 6.0.

Alternatively, again assuming a value of 10,000 ohms for R1, the values of R2 and R3 can be calculated via the theoretical equations method as follows:

$R1 = 10000 \quad R2 = 1 \quad R3 = 1$

Given $$\frac{5 \cdot R2 \cdot \frac{R3}{(R2+R3)}}{R1 + R2 \cdot \frac{R3}{(R2+R3)}} = 3.75$$

$$\frac{50 \cdot R1 \cdot \frac{R3}{(R1+R3)}}{R2 + R1 \cdot \frac{R3}{(R1+R3)}} = 5.00$$

$$\frac{-50 \cdot R1 \cdot \frac{R3}{(R1+R3)}}{R2 + R1 \cdot \frac{R3}{(R1+R3)}} = 2.50$$

$$\text{minerr}(R2, R3) = \begin{matrix} 3.10 \cdot 10^5 & R2 \\ 3.332 \cdot 10^4 & R3 \end{matrix}$$

The foregoing equations were solved using the above-identified Mathcad software.

To summarize, for the situation where the A/D converter 100 voltage Vin is positive, the calculated resistor values for R2 and R3 assuming R1 is 10,000 ohms are R1=10,000 ohms, R2=300,000 ohms, R2=33,320 ohms by the theoretical equations and R1=10,000 ohms, R2=300,000 ohms and R3=33,330 ohms via the current loop equations. According to a preferred mode of the present invention, actual values for R1, R2 and R3 using standard values are R1=10,000 ohms, R2=301,000 ohms and R3=33,200 ohms.

The second set of resistors includes resistors 138, 126 and 128 also designated $R_4$, $R_5$ and $R_6$, respectively. The method using simultaneous equations for this second set of resistors is as follows:

Equation 4: $V_2 = \frac{+5(R_5 \| R_6)}{(R_4 + R_5 \| R_6)}; V_2 = 1.25$

Equation 5: $V_2 = \frac{+50(R_4 \| R_6)}{(R_4 \| R_6 + R_5)}; V_2 = 2.50$

Equation 6: $V_2 = \frac{-50(R_4 \| R_6)}{(R_4 \| R_6 + R_5)}; V_2 = 0.00$

The current loop equation method for the second set of resistors is as follows. In the circuit of FIG. 6 the resistors 138, 126 and 128 are identified in this example R4, R5 and R6 respectively. I1 is the current flowing through resistor R4 toward the point V2 shown in FIG. 6, I2 is the current flowing through resistor R5 toward point V2 and I3 is the current flowing through resistor 6 away from point V2. The example includes three cases. In case 1, the voltages V1 and V3 shown in FIG. 6 are 2.5 volts and +50 volts, respectively, in case 2 V1 is +1.25 volts and V3 is +0 volts, and in case 3 V1 is 0 volts and V3 is -50 volts.

The current loop equations in reference to the node at point V1 in the circuit of FIG. 6 are as follows:

Case 4 (Equation 4)

$$I_1 = \frac{5-2.5}{R4}; I_2 = \frac{50-2.5}{R5}; I_3 = \frac{2.5-0}{R6}; I3 = I1 + I2$$

Therefore: $\frac{2.5}{R6} = \frac{2.5}{R4} + \frac{47.5}{R5}$

Case 5 (Equation 5)

$$I_1 = \frac{5-1.25}{R4}; I_2 = \frac{0-1.25}{R5}; I_3 = \frac{1.25-0}{R6}; I3 = I1 + I2$$

Therefore: $\frac{1.25}{R6} = \frac{3.75}{R4} + \frac{-1.25}{R5}$

Case 6 (Equation 6)

$$I_1 = \frac{5-0}{R4}; I_2 = \frac{-50-0}{R5}; I_3 = \frac{0-0}{R6}; I3 = I1 + I2$$

Therefore: $\frac{0}{R6} = \frac{5}{R4} + \frac{-50}{R5}$

Assuming a value of 10,000 ohms for R4, the values of R5 and R6 an be calculated via the current loop equations as follows:

$R4 = 10000 \quad R5 = 1 \quad R6 = 1$

Given $$\frac{2.5-0}{R6} = \frac{5-2.5}{R4} + \frac{50-2.5}{R5}$$

$$\frac{1.25-0}{R6} = \frac{5-1.25}{R4} - \frac{1.25-0}{R5}$$

$$\frac{0-0}{R6} = \frac{5-0}{R4} + \frac{0-(-50)}{R5}$$

$$\text{find}(R5, R6) = \begin{matrix} 1 \cdot 10^5 & R5 \\ 3.488 \cdot 10^3 & R6 \end{matrix}$$

The foregoing equations were solved using the above-identified Mathcad software.

Alternatively, again assuming a value of 10,000 ohms for R4, the values of R5 and R6 can be calculated via theoretical equations as follows:

$R4 = 10000 \quad R5 = 1 \quad R6 = 1$

Given

-continued $$\frac{5 \cdot R5 \cdot \frac{R6}{(R5 + R6)}}{R4 + R5 \cdot \frac{R6}{(R5 + R6)}} = 1.25$$

$$\frac{50 \cdot R4 \cdot \frac{R6}{(R4 + R6)}}{R5 + R4 \cdot \frac{R6}{(R4 + R6)}} = 2.50$$

$$\frac{-50 \cdot R4 \cdot \frac{R6}{(R4 + R6)}}{R5 + R4 \cdot \frac{R6}{(R4 + R6)}} = 0.00$$

$$\text{minerr}(R5, R6) = \begin{matrix} 9.999 \cdot 10^4 & R5 \\ 3.448 \cdot 10^3 & R6 \end{matrix}$$

The foregoing equations were solved using the above-identified Mathcad software.

To summarize, for the situation where the A/D converter 100 voltage $V_{ref}$ is positive, the calculated resistor values for R5 and R6 assuming R4 is 10,000 ohms are R4—10,000 ohms, R5=99,990 ohms and R6=3,448 ohms by the theoretical equations and R4=10,000 ohms, R5=100,000 ohms and R6=3,448 ohms via the current loop equations. According to a preferred mode of the present invention, actual values for resistors R4, R5 and R6 using standard values are R4=10,000 ohms, R5=100,000 ohms and R6=3,300 ohms.

Figure 7:
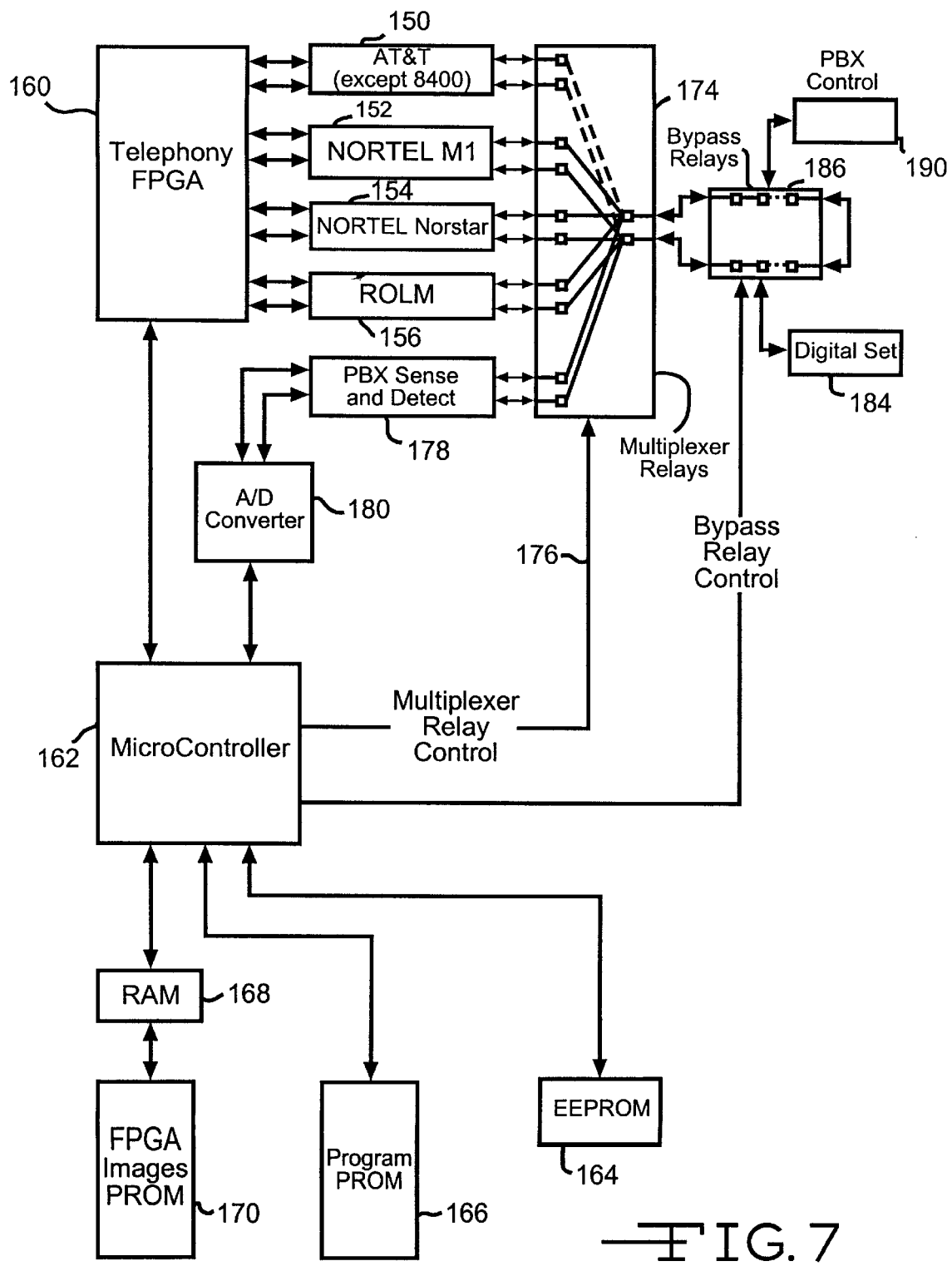
FIG. 7 is a block diagram further illustrating the system of the present invention.

The operation of the system of the present invention and its relation to the computer telephony interface are illustrated further in FIG. 7. The four PBXs for which the information in Table 1 was provided are designated 150, 152, 154 and 156. While all four PBXs are shown in FIG. 7 for purposes of illustration, the computer telephony interface will be connected to only one PBX at any given time. The PBXs 150, 152, 154 and 156 shown in FIG. 7 are connected to the field programmable gate array 160 of the computer telephony interface. Gate array 160, in turn, is connected to the microcontroller/microprocessor 162 of the computer telephony interface. Microcontroller 162 has associated therewith EE PROM 164, Program PROM 166 and RAM 168. A Field Programmable Gate Array Images Prom 170 of the computer telephony interface is connected to RAM 168.

The multiplexer relays designated 174 in FIG. 7 are representative of the multiplexers 84 and 86 in the arrangement of FIG. 5 and of the relay network 112 in the circuit of FIG. 6. Control signals from microcontroller 162 are applied to multiplexer relays 174 via line 176. The PBX Sense and Detect component 178 shown in FIG. 7 corresponds to the line conditioning circuit 94 in FIGS. 5 and 6. It is connected to the analog to digital converter 180 of the computer telephony interface, and A/D converter 180, in turn, is connected to microcontroller 162.

The multiplexer relays 174 under control of microcontroller 162 connect the PBX Sense and Detect Component 178 to the PBX lines to sample the voltages in the manner previously described. Once the type of PBX is determined, the PBX is connected to the digital telephone set 184. This is accomplished by bypass relays 186 in response to control signals received on line 188 from microcontroller 162. During the PBX detection mode when the PBX Sense and Detect Component 178 is connected to the PBX lines, bypass relays 186 are switched out of the circuit by a signal from a PBX Connect component 190.

It is therefore apparent that the present invention accomplishes its intended objectives. There is provided a system and method for automatically sensing, detecting and identifying a telephone PBX which requires no manual intervention or inventory of individual hardware modules. As a result, in computer/telephony integration, modifications needed between PBX integration platforms advantageously would involve software and firmware rather than hardware. In addition, this allows a simplified user interface to be provided which minimizes the amount of prior knowledge required from the user and reduces the time from setup to full operation by having the system configure itself to the user's needs.

While an embodiment of the present invention has been described in detail, that is for the purpose of illustration, not limitation.

What is claimed is:

1. In a telephone system including a PBX connected between a central/public office switch and one or more telephone terminals:
   (a) means comprising a computer telephony interface connected to said PBX for establishing computer control over features offered by said PBX through said computer telephony interface; and
   (b) means operatively associated with said computer telephony interface and responsive to an operational characteristic of said PBX for identifying the type of PBX connected to said computer telephony interface.

2. The telephone system according to claim 1, wherein said means for identifying said PBX comprises:
   (a) means for sensing the magnitude of an electrical quantity associated with the operation of said PBX; and
   (b) means for utilizing said magnitude of said electrical quantity to identify the type of said PBX.

3. The telephone system according to claim 2, herein said means for utilizing said magnitude of said electrical quantity comprises:
   (a) means for storing information on a plurality of magnitudes of said electrical quantity for a corresponding plurality of different types of PBXs; and
   (b) means for comparing said magnitudes of said electrical quantity to said information to identify the type of said PBX.

4. The telephone system according to claim 1, wherein said means for identifying said PBX comprises:
   (a) means for determining the magnitude of d.c. voltage between said PBX and said one or more telephone terminals; and
   (b) means for utilizing said magnitude of said d.c. voltage to identify the type of said PBX.

5. The telephone system according to claim 4, wherein said means for utilizing said magnitudes of d.c. voltage comprises:
   (a) means for storing information on a plurality of magnitudes of said d.c. voltage for a corresponding plurality of different types of PBXs; and
   (b) means for comparing said magnitude of d.c. voltage to said information to identify the type of said PBX.

6. The telephone system according to claim 1, wherein said means for identifying said PBX comprises:
   (a) means for extracting the d.c. voltage between said PBX and said one or more telephone terminals;
   (b) means for digitizing said extracted d.c. voltage;
   (c) means for storing information on a plurality of d.c. voltages for a corresponding plurality of different types of PBXs; and
   (d) means for comparing said digitized d.c. voltage to said information to identify the type of said PBX.

7. The telephone system according to claim 6, further including means operatively connected to said means for extracting and said means for digitizing for conditioning the extracted d.c. voltage before digitizing the same.

8. A method for identifying the type of PBX in a telephone system including a PBX connected between a central/public office switch and one or more telephone terminals wherein a computer telephony interface is connected to said PBX, said method comprising:

(a) sensing an operational characteristic of said PBX; and (b) utilizing the sensed operational characteristic to identify the type of said PBX.

9. The method according to claim 8 wherein, said operational characteristic is an electrical quantity.

10. The method according to claim 9, wherein said electrical quantity is the d.c. voltage between said PBX and said one or more telephone terminals.

11. The method according to claim 8, wherein said operational characteristic is the magnitude of an electrical quantity and wherein said step of utilizing the sensed operational characteristic comprises comparing the magnitude of said electrical quantity to information on a plurality of magnitude of said electrical quantity for a corresponding plurality of different types of PBXs to identify the type of said PBX.

12. The method according to claim 11, wherein said electrical quantity is the d.c. voltage between said PBX and said one or more telephone terminals.

13. A method for identifying the type of PBX in a telephone system including a PBX connected between a central/public office switch and one or more telephone terminals wherein a computer telephony interface is connected to said PBX, said method comprising:

(a) storing information on predetermined operational characteristics of a plurality of different types of PBXs;

(b) sensing an operational characteristic of said PBX; and (c) comparing the sensed operational characteristic to said information to identify the type of PBX.

14. The method according to claim 13, wherein said operational characteristic is the magnitude of an electrical quantity.

15. The method according to claim 14, wherein said electrical quantity is the d.c. voltage between said PBX and said one or more telephone terminals.

16. A method for identifying the type of PBX in a telephone system including a PBX connected between a central/public office switch and one or more telephone terminals wherein a computer telephony interface is connected to said PBX, said method comprising:

(a) determining an operational characteristic which differentiates a plurality of different types of PBXs; and (b) utilizing said operational characteristic by means of said computer telephony interface to identify the type of said PBX.

17. The method according to claim 16 further including storing information on the differentiating operational characteristics of said plurality of PBXs and wherein said step of utilizing said operational characteristic comprises:

(a) sensing an operational characteristic of said PBX; and (b) comparing the sensed operational characteristic to said information to identify the type of said PBX.

18. The method according to claim 16, wherein said operational characteristic is the magnitude of an electrical quantity.

19. The method according to claim 18, wherein said electrical quantity is the d.c. voltage between said PBX and said one or more telephone terminals.

20. The method according to claim 17, wherein said operational characteristic is the magnitude of an electrical quantity.

21. The method according to claim 20, wherein said electrical quantity is the d.c. voltage between said PBX and said one or more telephone terminals.

22. A system for identifying the type of PBX in a telephone network including a PBX connected at one end to a central/public office switch and connected by a plurality of lines to one or more telephone terminals wherein a computer telephony interface including a microcontroller is connected to said PBX, said system comprising:

(a) an analog to digital converter having an input and having an output connected to said microcontroller;

(b) a conditioning circuit having an input and having an output connected to the input of said analog to digital converter; and (c) switching means connected between said lines and the input of said conditioning circuit for routing a selected pair of said lines to said conditioning circuit;

(d) so that an electrical operational parameter of said PBX can be sensed by said microcontroller for identifying the type of said PBX.

23. The system according to claim 22, wherein said microcontroller has operatively associated therewith:

(a) means for storing information on a plurality of electrical operational parameters for a corresponding plurality of different types of PBXs; and (b) means for comparing said electrical operational parameter of said PBX to said information to identify the type of said PBX.

24. The system according to claim 22, wherein said conditioning circuit comprises:

(a) means for lowering voltage from a range present on said lines to a range suitable for use by said analog to digital converter;

(b) means for converting differential voltage on said lines to ground referenced voltage for use by said analog to digital converter; and (c) means for supporting negative voltage on the input to said analog to digital converter.

25. The system according to claim 22, wherein said conditioning circuit comprises:

(a) a first resistor voltage divider network connected to the input of said analog to digital network and to a circuit ground reference for lowering voltage from a range present on said lines to a range suitable for said analog to digital converter and for converting differential voltage on said lines to ground referenced voltage for use by said analog to digital converter; and (b) a second resistor network connected to bias voltage means and to the input of said analog to digital converter for supporting negative voltage on the input to said analog to digital converter.

* * * * *